US011366986B2

(12) United States Patent
Gavrilovic et al.

(10) Patent No.: US 11,366,986 B2
(45) Date of Patent: Jun. 21, 2022

(54) METHOD FOR CREATING A COLLISION DETECTION TRAINING SET INCLUDING EGO PART EXCLUSION

(71) Applicants: Milan Gavrilovic, Uppsala (SE); Andreas Nylund, Rönninge (SE); Pontus Olsson, Stockholm (SE)

(72) Inventors: Milan Gavrilovic, Uppsala (SE); Andreas Nylund, Rönninge (SE); Pontus Olsson, Stockholm (SE)

(73) Assignee: Orlaco Products, B.V., Barneveld (NL)

( * ) Notice: Subject to any disclaimer, the term of this patent is extended or adjusted under 35 U.S.C. 154(b) by 92 days.

(21) Appl. No.: 16/811,362

(22) Filed: Mar. 6, 2020

(65) Prior Publication Data

US 2020/0285904 A1 Sep. 10, 2020

Related U.S. Application Data

(60) Provisional application No. 62/815,609, filed on Mar. 8, 2019.

(51) Int. Cl.
*G06K 9/00* (2022.01)
*G06K 9/62* (2022.01)
*G08G 1/16* (2006.01)
*G06V 20/58* (2022.01)

(52) U.S. Cl.
CPC ........... *G06K 9/6261* (2013.01); *G06V 20/58* (2022.01); *G08G 1/166* (2013.01)

(58) Field of Classification Search
CPC ............. G06K 9/6261; G06K 9/00805; G06K 9/6273; G06K 9/3233; G08G 1/166
See application file for complete search history.

(56) References Cited

U.S. PATENT DOCUMENTS

| 7,295,227 B1 | 11/2007 | Asahi et al. |
| 8,044,779 B2 | 10/2011 | Hahn et al. |
| 8,451,107 B2 | 5/2013 | Lu et al. |

(Continued)

FOREIGN PATENT DOCUMENTS

| DE | 102005051804 | 11/2007 |
| DE | 102016002470 | 8/2017 |

(Continued)

OTHER PUBLICATIONS

International Search Report and Written Opinion for International Application No. PCT/EP2020/056107 dated Sep. 15, 2020.

(Continued)

*Primary Examiner* — Dhaval V Patel
(74) *Attorney, Agent, or Firm* — Carlson, Gaskey & Olds, P.C.

(57) ABSTRACT

A vehicle includes a vehicle body having a camera and at least one ego part connection. An ego part is connected to the vehicle body via the ego part connection. A collision detection system is communicatively coupled to the camera and is configured to receive a video feed from the camera. The collision detection system being configured to identify an exclusion region of each frame corresponding to the ego part, perform an object detection on a remainder of each (Continued)

frame, and generate a collision detection warning in response to an object being detected by the object detection system.

21 Claims, 4 Drawing Sheets

(56) References Cited

U.S. PATENT DOCUMENTS

| | | | |
|---|---|---|---|
| 8,953,011 | B2 | 2/2015 | Lang et al. |
| 9,796,332 | B2 | 10/2017 | Lu et al. |
| 2012/0265416 | A1 | 10/2012 | Lu et al. |
| 2013/0250046 | A1 | 9/2013 | Schofield et al. |
| 2014/0085472 | A1* | 3/2014 | Lu .................. B60R 1/002 348/148 |
| 2016/0137123 | A1 | 5/2016 | Fursich et al. |
| 2016/0137126 | A1* | 5/2016 | Fursich ............. H04N 13/239 348/38 |
| 2018/0170327 | A1* | 6/2018 | Lee .................. G06K 9/00798 |
| 2019/0016264 | A1* | 1/2019 | Potnis ................ B60D 1/64 |
| 2019/0219681 | A1* | 7/2019 | Atsushi ................ G01S 7/411 |
| 2019/0259284 | A1* | 8/2019 | Khadloya ............. G06T 7/97 |
| 2019/0299859 | A1* | 10/2019 | Lu ..................... H04N 7/181 |
| 2020/0258320 | A1* | 8/2020 | Lu ..................... G05D 1/0022 |
| 2020/0380675 | A1* | 12/2020 | Golden ............... G16H 50/70 |

FOREIGN PATENT DOCUMENTS

| | | |
|---|---|---|
| EP | 3138736 | 7/2018 |
| WO | 2018050373 | 3/2018 |

OTHER PUBLICATIONS

MATLAB, Ground Plane and Obstacle Detection Using Lidar—MATLAB & Simulink—MathWorks, (Sep. 13, 2018), XP055697753, Retrieved from the Internet: URL:https://de.mathworks.com/help/releases/R2018b/driving/examples/ground-plane-and-obstacle-detectionusing-lidar.html?searchHighlight=obstacle&s_tid=doc_srchtitle.

Eppel, Sagi, Classifying a specific image region using convolutional nets with an ROI mask as input, (Dec. 2, 2018), XP080987857.

Tylecek, Radim, et al., Consistent Semantic Annotation of Outdoor Datasets via 2D/3D Label Transfer, Sensors, vol. 18, No. 7, Jul. 12, 2018 (Jul. 12, 2018), p. 2249, XP055653466, DOI: 10.3390/s18072249.

International Preliminary Report of Patentability for International Application No. PCT/EP2020/056107 dated Aug. 25, 2021.

* cited by examiner

METHOD FOR CREATING A COLLISION DETECTION TRAINING SET INCLUDING EGO PART EXCLUSION

CROSS-REFERENCE TO RELATED APPLICATION

This application claims priority to U.S. Provisional Application No. 62/815,609 filed on Mar. 8, 2019.

TECHNICAL FIELD

The present disclosure relates generally to vehicle collision detection systems, and more specifically to an ego part exclusion training set for neural network based collision detection systems.

BACKGROUND

Modern vehicles include multiple sensors and cameras distributed about all, or a portion, of the vehicle. The cameras provide video images to a controller, or other computerized systems within the vehicle. Included on some vehicles are collision detection systems. The collision detection systems analyze the incoming video images and determine when an object is likely to collide with the vehicle.

In some instances, ego parts (i.e. parts that are connected to, but distinct from, a vehicle) are attached to the vehicle and can be within the field of vision of one or more of the cameras providing images to the collision detection system. Due to the nature of existing camera systems, the image of the ego parts are analyzed along with a remainder of the incoming video. This analysis wastes computing power on analyzing sections of the video feed where we do not expect another object to be present due to the presence of the ego part(s). The waste can be substantial, as the ego part(s) often occupy a significant portion of the field of view of a given camera feed. Further in some systems, the ego part(s) can trigger a false collision warning due to their independent motion or due to a similarity between a given ego part and other objects in the view of the camera.

SUMMARY OF THE CLAIMS

In one exemplary embodiment a vehicle includes a vehicle body having a camera and at least one ego part connection, an ego part connected to the vehicle body via the ego part connection, a collision detection system communicatively coupled to the camera and configured to receive a video feed from the camera, and the collision detection system being configured to identify an exclusion region of each frame corresponding to the ego part, perform an object detection on a remainder of each frame, and generate a collision detection warning in response to an object being detected by the object detection system.

In another example of the above described vehicle the collision detection system is a neural network trained via a data set including exclusion zones corresponding to at least one type of ego part.

In another example of any of the above described vehicles the data set includes exclusion zones corresponding to a plurality of types of ego parts.

In another example of any of the above described vehicles the plurality of types of ego parts includes a bucket, a ripper, a door, a staircase, a trailer, and a dolly.

In another example of any of the above described vehicles each frame of the data set includes at least one annotation corresponding to the exclusion zone defined in the frame.

In another example of any of the above described vehicles the at least one annotation is an image plane annotation corresponding to at least one feature of the image.

In another example of any of the above described vehicles the at least one annotation is a 3D space annotation corresponding to a relative positioning of the ego part and the vehicle.

In another example of any of the above described vehicles the data set is augmented using at least one of Y-axis flipping, image smoothing/blurring/stretching/skewing, addition of Gaussian noise, and increasing or decreasing contrast.

In another example of any of the above described vehicles the collision detection system is configured to generate a 3D geometry of an ego part corresponding to the identified exclusion region.

In another example of any of the above described vehicles the collision detection system is configured to merge the generated 3D geometry of the identified exclusion region and a stored 3D geometry of the vehicle body, thereby creating a combined geometry.

In another example of any of the above described vehicles the collision detection warning is generated in response to the collision detection system determining that the detected object will collide with the combined geometry.

In another example of any of the above described vehicles the exclusion zone includes at least one fully surrounded inclusion zone.

An exemplary method for operating a vehicle collision detection system includes, receiving a video feed from a camera, identifying an ego part disposed within the video feed, identifying an exclusion zone corresponding to the ego part, performing an object detection on a first portion of each frame of the video feed, wherein the first portion excludes the exclusion zone, and generating a collision detection warning in response to an object being detected by the object detection system.

In another example of the above described method for operating a vehicle collision detection system identifying the exclusion zone includes identifying at least one inclusion zone defined within the exclusion zone.

In another example of any of the above described methods for operating a vehicle collision detection system the first portion further includes at least one inclusion zone.

In another example of any of the above described methods for operating a vehicle collision detection system identifying the ego part disposed within the view further includes determining a 3D geometry of the ego part and combining the 3D geometry of the ego part with a 3D geometry of the vehicle, thereby creating a combined geometry.

In another example of any of the above described methods for operating a vehicle collision detection system performing the object detection on the first portion of each frame of the video feed includes comparing an object position with the combined geometry.

In another example of any of the above described methods for operating a vehicle collision detection system the collision detection system is a neural network trained via a data set including exclusion zones corresponding to at least one type of ego part.

In another example of any of the above described methods for operating a vehicle collision detection system the data set includes exclusion zones corresponding to a plurality of types of ego parts.

DETAILED DESCRIPTION

Figure 1:
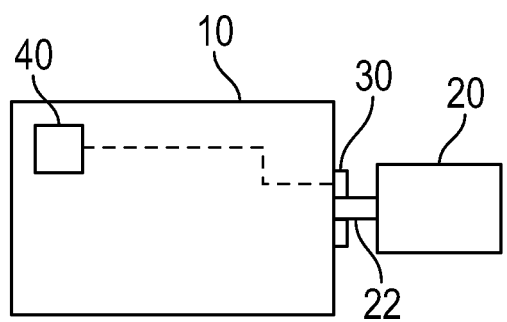
FIG. 1 illustrates an exemplary vehicle including an ego part connected to the vehicle.

Described herein is a collision detection system for use within a vehicle that may potentially interact unsafely with other vehicles, objects, or pedestrians during standard operation. Such interactions can result in harm to either the vehicle or the objects (e.g. people, animals, other vehicles, etc.) with which the vehicle interacts. FIG. 1 schematically illustrates one exemplary vehicle 10 including an attached ego part 20 connected to the vehicle 10 via a hitch 22. In the illustrated example, the ego part 20 is connected to the rear of the vehicle and can include a bucket, a ripper, door, staircase, trailers, dollies or any other element of equipment or components that can be connected to the vehicle 10. In alternative examples, the system described herein can be applied to any ego part 20 and is not limited to a construction vehicle.

Also included on the vehicle 10 is at least one camera 30, which provides a video feed to a collision detection system 40. The collision detection system 40 can be included within a general vehicle controller, or be a distinct computer system depending on the particular application. Included within the vehicle 10, but not illustrated for simplicity are, a camera mount, a camera housing, a system for processing the data generated by the camera, and multiple additional sensors.

The collision detection system 40 incorporates a method for recognizing and identifying ego parts 20 connected to the vehicle 10. By recognizing that the ego parts 20 do not have the potential to collide with the vehicle 10, and by recognizing which portions of the video feed represent the ego part 20, the collision detection system 40 can forgo analysis of the portions of the video feed that include the ego parts 20, thereby saving processing power and preventing incorrect collision warnings from being triggered.

The algorithms contained within the collision detection system 40 track the ego parts 20 in combination with, or without, kinematic or other mathematical models that describe the motion of the vehicle 10 and the connected parts (e.g. ego part 20) depending on the specifics of the given collision detection system 40. The ego part 20 is tracked independent of the source of the action that caused the movement of the part, relative to the vehicle 10. In other words, the tracking of the ego part 20 is not reliant on knowledge of the motion of the vehicle 10.

Also included with the collision detection system 40 is an algorithm that detects potential interactions with exterior objects based on the camera and sensor data provided. When a potentially unsafe interaction is detected, the collision detection system 40 notifies a driver or other operator of the vehicle 10 to the potential unsafe interaction. In some examples, the collision detection system 40 can also initiate a recording of the event in question to allow for future analysis.

Figure 2:
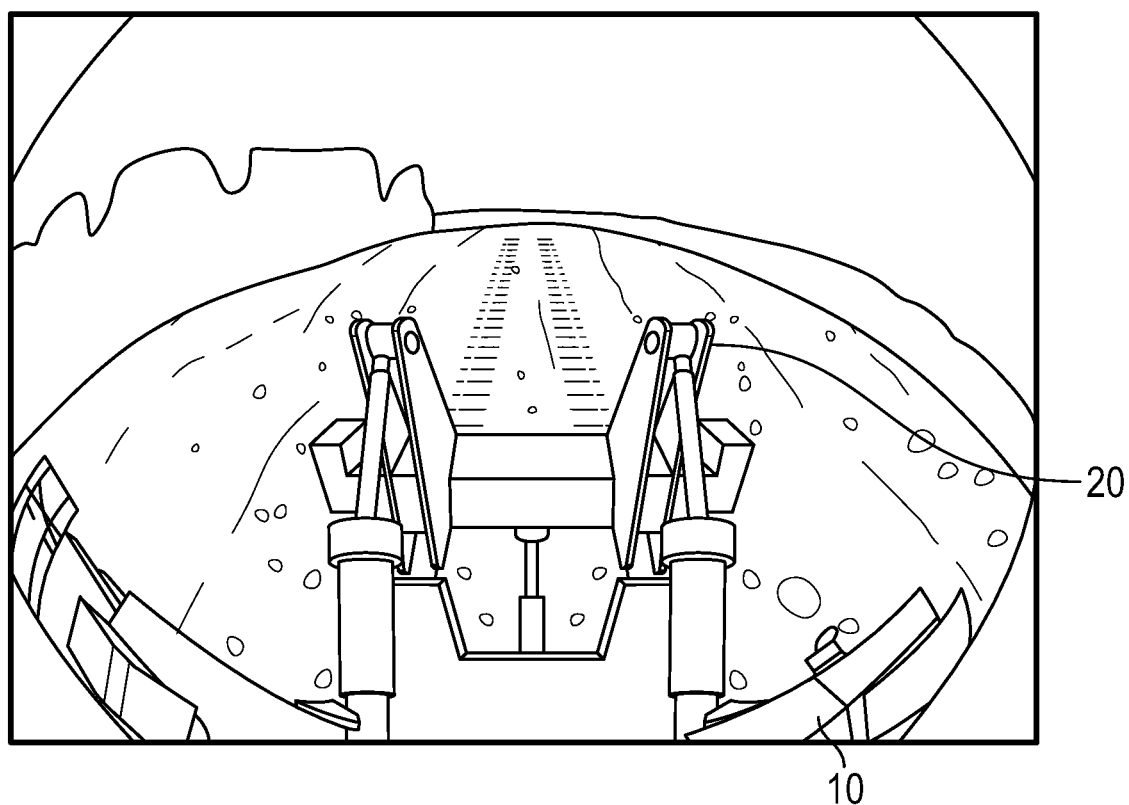
FIG. 2 schematically illustrates an exemplary image from a rear video camera for a collision detection system.

FIG. 2 illustrates an exemplary image from a camera 30 including an image of an ego part 20 that is connected to the vehicle 10. The illustrated ego part 20 is exemplary in nature and the system described herein can be utilized in conjunction with any ego part type, including those enumerated above, and is not limited to the specific illustrated example.

The object detection algorithm defined within the collision detection system 40 uses a Convolutional Neural Network (CNN) to detect/identify objects similar to those in a training set, and determine if those objects are likely to collide with the vehicle 10. As is understood in the art, training sets for neural networks such as CNNs utilize hundreds or thousands of tagged images to inform a computational system of the contents of the images. This training set is referred to as an off-line training data set and can be generated using existing video footage, or by creating video footage in a known and controlled environment. The object recognition of the CNN is paired with a collision detection algorithm to identify objects using the CNN and then utilize the CNN output to estimate a likelihood of colliding with the object via the collision detection algorithm. In alternate examples, alternative neural network types can be utilized to similar effect with minimal adaption to the systems described herein and the utilization of alternative neural network types is considered within the scope of this disclosure.

Some existing methods of object detection estimate a current object position based at least in part on previous object position estimations. These methods concentrate the object detection algorithm focus on places where objects were previously detected, rather than on where the objects are currently in the image. This can result in a system, which does not react sufficiently to sudden changes in a vehicle's environment (e.g. the sudden appearance of a car behind a truck, which was obscuring the camera's vision or a pedestrian stepping out from behind another obstacle).

To eliminate the reliance on an object's previous position, the algorithm utilized herein examines the entire field of view on a continuous basis, eliminating potential bias caused by the reliance on previous measurements. The data captured from the camera is then fed to the CNN, the output of which gives a probability that there is an object within the camera's field of view. When the probability that an object has been detected exceeds a particular threshold, the object is assumed to have been detected. In examples where an ego part 20 is attached to a vehicle 10, the ego part 20 cannot collide with the vehicle 10 absent a failure of the hitch 22, or other connection and thus does not need to be considered for collision avoidance. FIG. 2 illustrates a static camera view of one such example. Once this fact is appreciated, the continuous examination of the field of view is restricted to omit the portions of the field of view that contain the ego part.

In one example collision detection system 40, the fixed view of the elevated camera 30 results in a stationary horizon relative to the vehicle, meaning that the distance to the horizon and to the edges of the field of view for the example are assumed to be invariant. If desired, a correction factor can be added for inclined terrain as determined by vehicle accelerometers, topographical data or other active sensing devices such as ultrasonics, radar, and LIDAR. In more general examples, the distance to the object may be determined using relative object size and position within the image, or information from other active sensing devices such as ultrasonics, radar, and LIDAR. In some examples, the automatically determined distance can be displayed to the operator in the camera feed via an overlay or any other display feature.

Once an object has been detected by the CNN, and the distance to the object determined, the computed distance is compared to a threshold value. If the distance to the object is less than the threshold value, a warning is transmitted to the automated braking system, another vehicle system, the driver and/or another operator of the vehicle 10. The warning can be of a visible, audio, or tactile nature, or any combination thereof.

In order to reduce computational difficulty, and decrease the time required for the computations, the CNN is provided with a training set that identifies one or more types of ego-parts 20 that can be connected to the vehicle 10. The training set further defines an exclusion zone within the camera's field of view based on a profile of the connected ego-part 20. The exclusion zone defines an area of the image where no object detection needs to occur due to the presence of the ego part 20 obscuring any other object in the view.

Figure 3A:
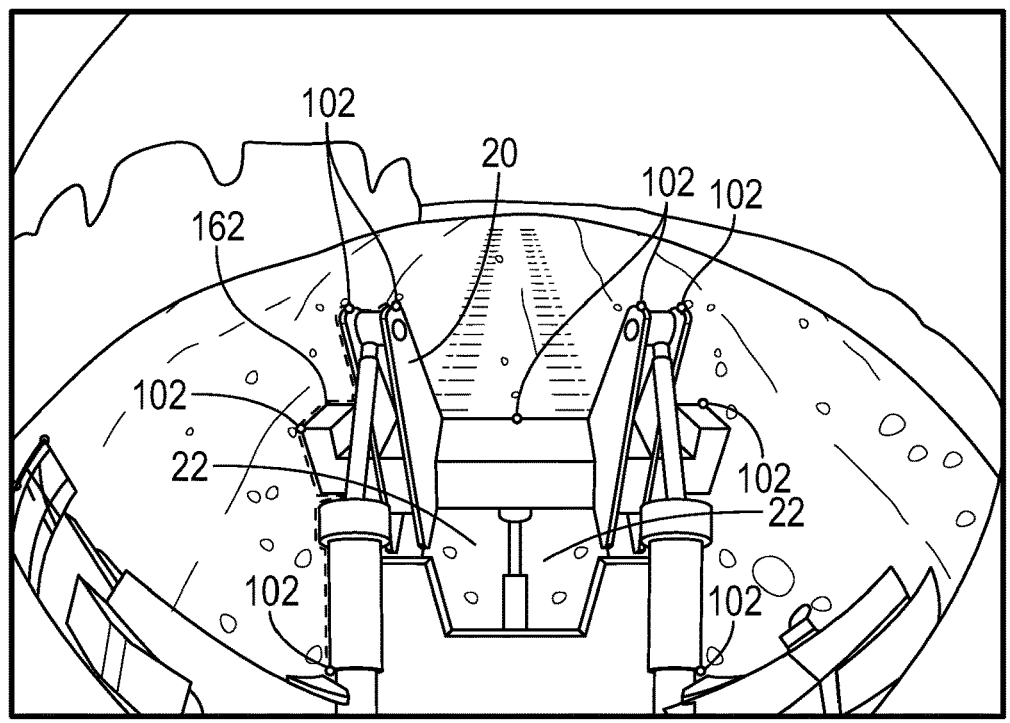
FIGS. 3A-3C illustrate a process for defining an exclusion region in a single frame of a training set.
Figure 3B:
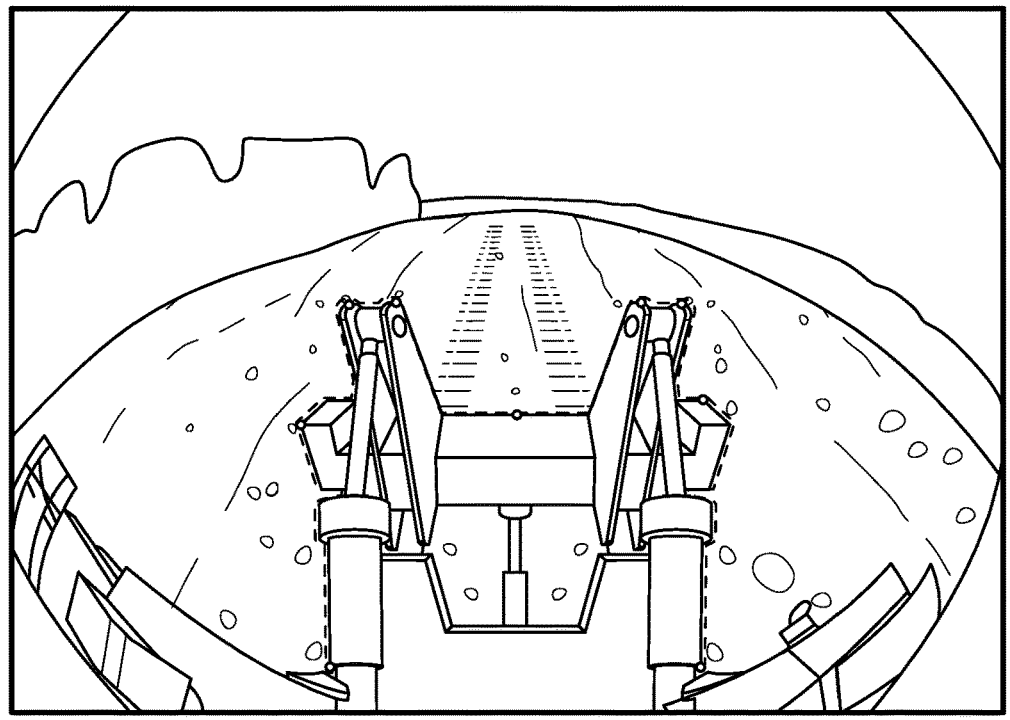
Figure 3C:
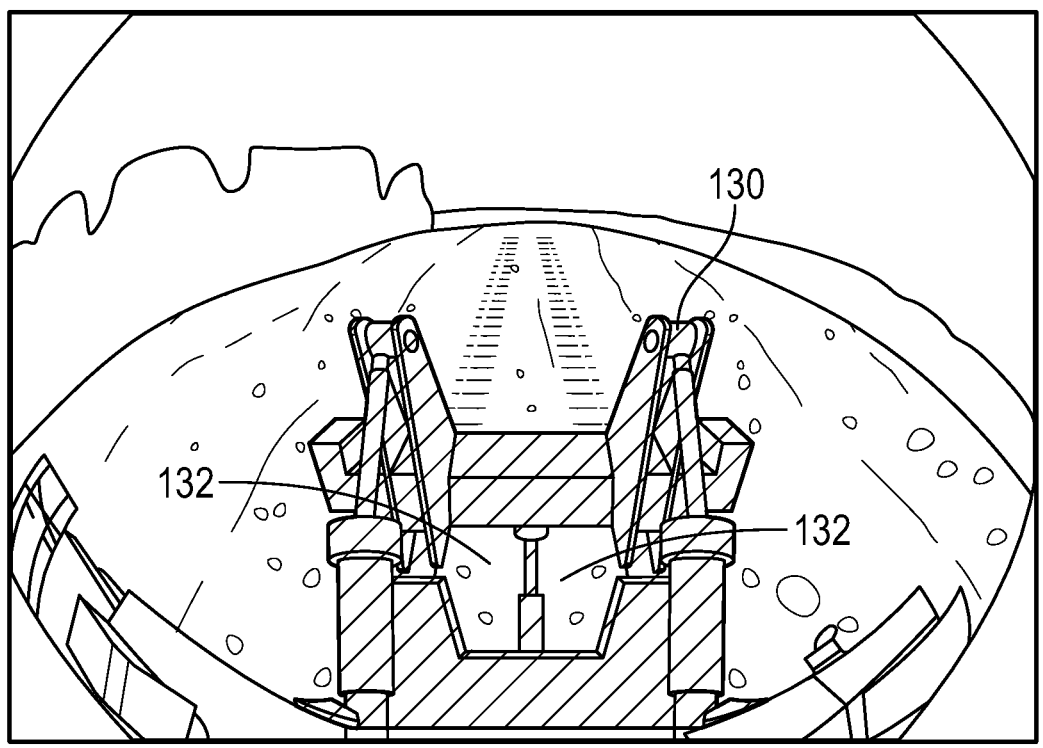
Figure 4:
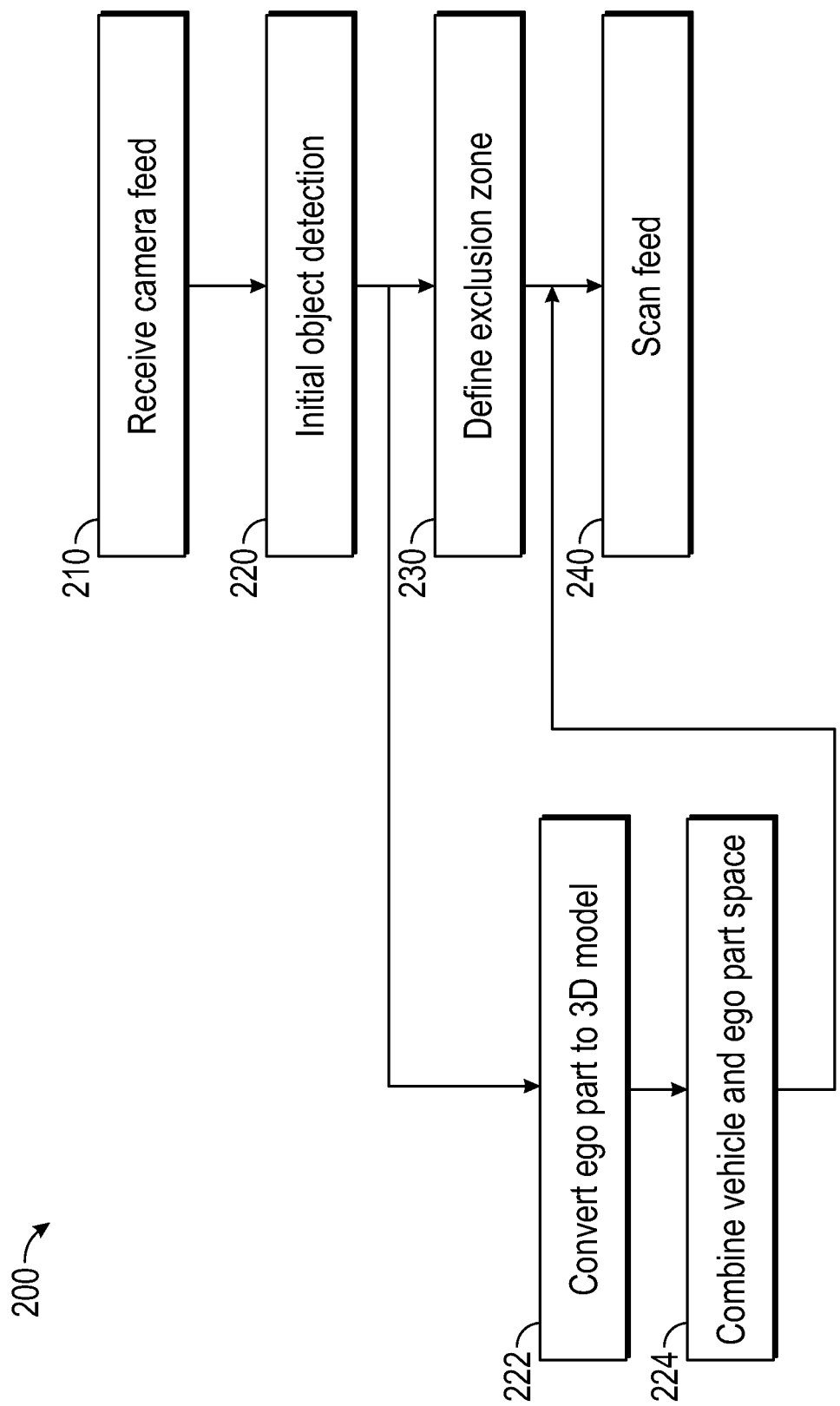
FIG. 4 is a flow chart defining a process for identifying and defining exclusion zones for training a neural network based collision detection system.

FIGS. 3A, 3B and 3C illustrate an exemplary method for identifying an exclusion zone within a single frame of a video that can be used for training a CNN for a collision detection system. Initially, a designer identifies anchor points 102 about an exterior of the ego part 20 within the frame. The anchor points 102 are positioned sequentially, beginning with a first anchor point at a base of the ego part 20, and traveling along the exterior edge of the ego part 20 to an opposite base of the ego part 20.

Once the anchor points 102 are identified, a tracing program traces a line from each anchor point 102 to the next anchor point 102 in the sequence along an outermost edge of the ego part 20 in the image. In the illustrated example, the tracing program utilizes any conventional tracing algorithm to follow an edge of the object from each anchor point 102 to the next anchor point 102. The tracing can includes straight line tracing, where a direct line is draw from each anchor point to the next anchor point, curved line tracing, where the algorithm attempts to follow a curve defined in the image, or a combination of the two techniques. The tracing progresses as shown in FIGS. 3A and 3B, until the last anchor point 102 is reached, and a straight line is drawn back to the first anchor point 102 from the last anchor point 102. The straight line encloses a zone 130. This zone 130 defines an initial exclusion zone where the ego part 20 is present and obscuring a field of view.

In some examples, such as the exemplary ego part 20 illustrated in FIGS. 2, 3A, 3B and 3C, the image of the ego part 20 can include openings 22 where the ego part 20 does not obscure the field of view of the camera 30. In such an example, a similar process is followed to trace the openings 22, resulting in voids within the exclusion zone, as shown in FIG. 3C. In such examples, one or more inclusion zones 132 can be included within (fully surrounded by) the exclusion zone 130, with the inclusion zone 132 tracing the opening. The inclusion zones 132 define an exception to the exclusion, where the field of view of the camera is not obstructed by the ego part. The boundaries of the inclusion zones 132 are defined using the same process identified above. Once defined within the training data set, the collision detection system can look for and identify expected inclusion zones of any given ego part that is detected.

As the field of view for any potential collisions with objects is obscured by the ego part 20 at the exclusion zone, there is no need to analyze the exclusion zone during collision detection. The enclosed exclusion zone is illustrated in FIG. 3C. Once the initial exclusion zone is defined by the tracing process, the designer can utilize conventional computer drafting tools to tweak, or modify, the exclusion zone to adjust for minor inaccuracies in the automated tracing process. These modifications can include manually adjusting edge positions, shifting an anchor point position, adding curves to the traced line, or any other drafting technique.

The process of FIGS. 3A-3C is then repeated for each frame within the training set video that will be utilized to train the CNN of the collision detection system 40. Further, some types of ego parts 20 move slowly, or minimally relative to the vehicle 10 to which they are attached, and thus an initially defined exclusion zone can be maintained for a period of time or a number of frames. By way of example, the illustrated ripper (ego part 20) may not shift position within a field of view for 15 seconds, and thus the exclusion zone, once defined by the collision detection system, can be maintained for 15 seconds in the image without needing to be redefined. In another example, the exclusion zone can represent a cabin door with the system recognizing that the cabin door will remain closed while the vehicle is operated for four hours. In this example, the exclusion zone can be maintained for four hours or until the door is opened, at which time the exclusion zone is redefined.

While illustrated with regards to a ripper in FIGS. 3A-3C, it is appreciated that the training set can include multiple types of ego-part 20 with each type of ego part undergoing a similar process defining the exclusion zone corresponding to that specific ego part type. Further, in order to ease the time commitment required to create the off line training data sets, it is understood that one of skill in the art can use any number of data augmentation techniques including per-pixel operations including increasing/decreasing intensity and color enhancement of pixels, pixel-neighborhood operations including smoothing, blurring, stretching, skewing and warping, image based operations including mirroring, rotating, and shifting the image, correcting for intrinsic or extrinsic camera alignment issues, rotations to mimic uneven terrain, y-axis flipping, and image superposition to further increase the amount of data in the training set.

The above defined process identifies a specific geometric zone corresponding to a profile of the ego part 20. In some examples, further annotations can be provided to each defined exclusion zone within the offline data set that is used for training the CNN. The annotations can be related to features of the captured image, referred to as image plane annotations, or related to 3D space features determined via other sensing systems, referred to as 3D space annotations. By way of example, the annotations can include a bounding box surrounding the ego part in each frame, an angular position of the ego part in each frame, a spatial location of the ego part relative to the vehicle in each frame, or any other annotations. In an exemplary practical application a portion of the annotations are automatically generated during the creation of the training data set. In another exemplary embodiment, the annotations are manually applied to entries within the training data set. The annotations assist the CNN in identifying the type and positioning of the ego part, and thus the type of exclusion zone to apply. By way of simplified example, if the CNN learns that a bucket requires a bounding box of at least a first size, and an identified ego-part can be contained with a bounding box smaller than the first size, the CNN can eliminate "bucket" from a list of possible types of the ego-part. This is a simplified example, and the algorithm utilized by the CNN in a practical example can be more nuanced, and will depend on the specifics of the off-line data set used to train the CNN. As can be appreciated from the above, more comprehensive annotations allow the collision detection system to better utilize the determined information.

As is described herein, data from the exclusion zone annotation tool is used for training a neural network. In addition to this function, the data from the annotation tool can assist in generating a 3D geometry of a given ego part. By fusing the neural network based detection of the ego-part and knowledge of 3D geometry, the system can determine accurate environment models around the vehicle. This can, in turn, allow a collision detection system to detect when the ego part is on a collision course with an object allowing the scope of collision detection provided by the collision detection system to be increased.

With reference to the FIGS. 1-3C, FIG. 4 provides a flow chart of a high level operation of a collision detection system that has been trained using at least one data set including the above described exclusion zone. Initially, the method 200 receives a camera feed at a collision detection system in a receive camera feed step 210. Once received, an initial detection operation is run on the first frame of the feed in an "Initial Object Detection" step 220. The initial object detection evaluates the image, and determines if any detected objects correspond to a known ego-part in a portion of the image adjacent to the vehicle. Alternatively, the initial object detection step 220 can be omitted, and a vehicle operator can inform the collision detection system directly that a known ego part has been connected in the field of view of the camera.

Once an ego part is detected, or a known ego part is input by the operator, the collision detection system defines an exclusion zone around the profile of the ego part, based on the learned exclusion zones from the off-line data set in a "Define Exclusion Zone" step 230. Once the exclusion zone has been defined, the portion of the image within the exclusion zone is not scanned and a remainder of each image in the feed is continuously scanned according to the collision detection system described above in a "Scan Feed" step 240. Alternatively, the exclusion zone system can be used with other known object detection systems to similar effect, and is not limited to application of the specifically described collision detection system.

Simultaneously with defining the exclusion zone, the collision detection system converts the detected type of ego part, and position of the ego part, into a 3D space/model in a "Convert Ego Part To 3D Model" step 222. The 3D model defines the three dimensional space occupied by the detected ego part according to any known methodology. Once defined, the 3D space/model of the ego part is added to a stored 3D space/model of the vehicle in a "Combine Vehicle and Ego Part Space" step 224. Once the combined 3D space is constructed, the collision detection system is able to utilize the combined 3D space including the 3D space/model of the ego part in determining imminent collisions according to the same process used to determine imminent collisions in datasets without the combined space.

Periodically, depending on the type of ego part attached, and the operation of the vehicle, the method 200 cycles to the define exclusion zone step 230 and redefines the exclusion zone. This redefinition of the exclusion zone allows the system to account for relative positional shifts between the ego part and the camera, resulting in different portions of the camera feed being obscured by the ego part.

While discussed herein with regards to a convolutional neural network, it is appreciated that the techniques and systems described herein can be applied using any type of neural network to achieve similar results. One of skill in the art will appreciate that each neural network has distinct advantages and disadvantages in any given application, and can determine an appropriate neural network to use for a given situation.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle comprising:
a vehicle body having a camera and at least one ego part connection;
an ego part connected to the vehicle body via the ego part connection; and
a collision detection system communicatively coupled to the camera and configured to receive a video feed from the camera, the collision detection system being configured to identify an exclusion region of each frame corresponding to the ego part, perform an object detection on a remainder of each frame, and generate a collision detection warning in response to an object being detected by the object detection system.

2. The vehicle of claim 1, wherein the collision detection system is configured to generate a 3D geometry of an ego part corresponding to the identified exclusion region.

3. The vehicle of claim 1, wherein the exclusion region of each frame corresponding to the ego part is an exclusion region having a geometry corresponding to a profile of the ego part.

4. A vehicle comprising:
a vehicle body having a camera and at least one ego part connection;
an ego part connected to the vehicle body via the ego part connection; and
a collision detection system communicatively coupled to the camera and configured to receive a video feed from the camera, the collision detection system being configured to identify an exclusion region of each frame corresponding to the ego part, generate a 3D geometry of an ego part corresponding to the identified exclusion region and merge the generated 3D geometry of the identified exclusion region and a stored 3D geometry of the vehicle body, thereby creating a combined geometry, perform an object detection on a remainder of each frame, and generate a collision detection warning in response to an object being detected by the object detection system.

5. The vehicle of claim 4, wherein the collision detection system is a neural network trained via a data set including exclusion zones corresponding to at least one type of ego part.

6. The vehicle of claim 5, wherein the data set includes exclusion zones corresponding to a plurality of types of ego parts.

7. The vehicle of claim 6, wherein the plurality of types of ego parts includes a bucket, a ripper, a door, a staircase, a trailer, and a dolly.

8. The vehicle of claim 4, wherein each frame of the video feed includes at least one annotation corresponding to the exclusion region defined in the frame.

9. The vehicle of claim 8, wherein the at least one annotation is an image plane annotation corresponding to at least one feature of the image.

10. The vehicle of claim 8, wherein the at least one annotation is a 3D space annotation corresponding to a relative positioning of the ego part and the vehicle.

11. The vehicle of claim 4, wherein the video feed is augmented using at least one of Y-axis flipping, image smoothing/blurring/stretching/skewing, addition of Gaussian noise, and increasing or decreasing contrast.

12. The vehicle of claim 4, wherein the collision detection warning is generated in response to the collision detection system determining that the detected object will collide with the combined geometry.

13. The vehicle of claim 4, wherein the exclusion region includes at least one fully surrounded inclusion zone.

14. A method for operating a vehicle collision detection system comprising:
   receiving a video feed from a camera;
   identifying an ego part disposed within the video feed;
   identifying an exclusion zone corresponding to the ego part;
   performing an object detection on a first portion of each frame of the video feed, wherein the first portion excludes the exclusion zone; and
   generating a collision detection warning in response to an object being detected by the object detection system.

15. The method of claim 14, wherein identifying the exclusion zone corresponding to the ego part includes defining an exclusion zone corresponding to a profile of the ego part.

16. A method for operating a vehicle collision detection system comprising:
   receiving a video feed from a camera;
   identifying an ego part disposed within the video feed and determining a 3D geometry of the ego part and combining the 3D geometry of the ego part with a 3D geometry of the vehicle, thereby creating a combined geometry;
   identifying an exclusion zone corresponding to the ego part;
   performing an object detection on a first portion of each frame of the video feed, wherein the first portion excludes the exclusion zone; and
   generating a collision detection warning in response to an object being detected by the object detection system.

17. The method of claim 16, wherein identifying the exclusion zone includes identifying at least one inclusion zone defined within the exclusion zone.

18. The method of claim 16, wherein the first portion further includes at least one inclusion zone.

19. The method of claim 16, wherein performing the object detection on the first portion of each frame of the video feed includes comparing an object position with the combined geometry.

20. The method of claim 16, wherein the collision detection system is a neural network trained via a data set including exclusion zones corresponding to at least one type of ego part.

21. The method of claim 20, wherein the data set includes exclusion zones corresponding to a plurality of types of ego parts.

* * * * *